United States Patent
Campbell et al.

(10) Patent No.: US 8,488,213 B2
(45) Date of Patent: Jul. 16, 2013

(54) METHODS AND SYSTEMS FOR NO-TOUCH SCANNING

(75) Inventors: Richard John Campbell, Camas, WA (US); Dana S. Smith, Dana Point, CA (US); Michael James Heilmann, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 617 days.

(21) Appl. No.: 12/696,814

(22) Filed: Jan. 29, 2010

(65) Prior Publication Data
US 2011/0188093 A1 Aug. 4, 2011

(51) Int. Cl.
*H04N 1/04* (2006.01)
*G06K 15/00* (2006.01)

(52) U.S. Cl.
USPC .......................................... 358/474; 358/1.16

(58) Field of Classification Search
USPC ................ 358/474, 448, 1.16, 523, 404, 444, 358/426.11
See application file for complete search history.

(56) References Cited

U.S. PATENT DOCUMENTS

| | | | |
|---|---|---|---|
| 5,511,148 A | 4/1996 | Wellner | |
| 5,666,443 A * | 9/1997 | Kumashiro | ................... 382/266 |
| 5,900,950 A | 5/1999 | Hsu | |
| 6,563,948 B2 | 5/2003 | Tan et al. | |
| 6,697,536 B1 | 2/2004 | Yamada | |
| 6,842,269 B2 | 1/2005 | Chen et al. | |
| 6,947,609 B2 | 9/2005 | Seeger et al. | |
| 7,839,543 B2 | 11/2010 | Watanuki | |
| 2002/0089699 A1 | 7/2002 | Konishi et al. | |
| 2006/0008156 A1 | 1/2006 | Kang | |
| 2009/0074291 A1* | 3/2009 | Iinuma | ......................... 382/178 |

FOREIGN PATENT DOCUMENTS

| | | | |
|---|---|---|---|
| JP | 10-093776 | * | 4/1998 |
| JP | 2001078176 A | | 3/2001 |
| JP | 2001-186304 A | | 7/2001 |
| JP | 2001238039 A | | 8/2001 |
| JP | 2002-320084 A | | 10/2002 |
| JP | 2004-208232 A | | 7/2004 |
| JP | 2004212440 A | | 7/2004 |
| JP | 2007-208821 A | | 8/2007 |
| JP | 2008199350 A | | 8/2008 |
| JP | 2008306368 A | | 12/2008 |

OTHER PUBLICATIONS

Japanese Office Action—Japanese Patent Application No. 2011-016522—Mailing Date May 8, 2012.
Japanese Office Action—Patent Application No. 2011-016522—Mailing Date: May 8, 2012.
Japanese Office Action—Patent Application No. 2011-016522—Mailing Date: Jan. 22, 2013.

* cited by examiner

*Primary Examiner* — Jerome Grant, II
(74) *Attorney, Agent, or Firm* — Kristine Elizabeth Matthews; David C. Ripma (57) ABSTRACT

Aspects of the present invention are related to systems and methods for scanning a document wherein a scan function is invoked implicitly by a user positioning a document object, or document objects, to be scanned near an active surface of the scanner. According to one aspect of the present invention, the user's intent to scan a document object may be determined by an active-sensing pipeline.

27 Claims, 8 Drawing Sheets

METHODS AND SYSTEMS FOR NO-TOUCH SCANNING

FIELD OF THE INVENTION

Embodiments of the present invention relate generally to scanning devices and methods for scanning, and, in particular, to low-cost, easy-to-use scanners.

BACKGROUND

Typical scanning devices operate on a request-driven user-interface (UI) model, wherein a scan function is invoked explicitly by a user through the push of a button or other similar contact means. The request-driven UI model may be cumbersome to a user in many situations, for example, during the scanning of bound content, for example, a book, a magazine or other bound volume. Under the request-driven UI paradigm, a user must first place the bound volume on the scanning surface and then initiate the scan, often by a button press, and in some cases, by a button press on a non co-located computer networked to the scanner. This may require the user to release the volume being scanned, which may in turn influence the quality of the scanned image.

Additionally, traditional line scanners may have a shallow depth of field making it difficult to capture a non-planar object due to the requirement that the object to be scanned must be placed at a precise distance from the scan bar.

Low-cost consumer scanners are slow and require precise manufacturing to ensure precision movement of the linear scan bar, and camera-based document imagers employ request-driven UIs and require bulky, expensive copy stands.

A scanning system that overcomes the above-mentioned shortcomings and other shortcomings may be desirable.

SUMMARY

Embodiments of the present invention comprise methods and systems for scanning a document. In some embodiments of the present invention, a scan function may be invoked implicitly by a user positioning a document, or documents, to be scanned on, or near, an active surface of a scanning device in accordance with embodiments of the present invention. According to one aspect of the present invention, the user's intent to scan a document may be determined by an active-sensing pipeline.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Typical scanning devices operate on a request-driven user-interface (UI) model, wherein a scan function is invoked explicitly by a user through the push of a button or other similar contact means. The request-driven UI model may be cumbersome to a user in many situations, for example, during the scanning of bound content, for example, a book, a magazine or other bound volume. Under the request-driven UI paradigm, a user must first place the bound volume on the scanning surface and then initiate the scan, often by a button press, and in some cases, by a button press on a non co-located computer networked to the scanner. This may require the user to release the volume being scanned, which may in turn influence the quality of the scanned image.

Additionally, traditional line scanners may have a shallow depth of field making it difficult to capture a non-planar object due to the requirement that the object to be scanned must be placed at a precise distance from the scan bar.

Low-cost consumer scanners are slow and require precise manufacturing to ensure precision movement of the linear scan bar, and camera-based document imagers employ request-driven UIs and require bulky, expensive copy stands.

A scanning system that overcomes the above-mentioned shortcomings and other shortcomings may be desirable.

Some embodiments of the present invention comprise a scanner system that may infer user intent by active sensing and may automatically initiate scanning in response to the inferred user intent.

Figure 1A:
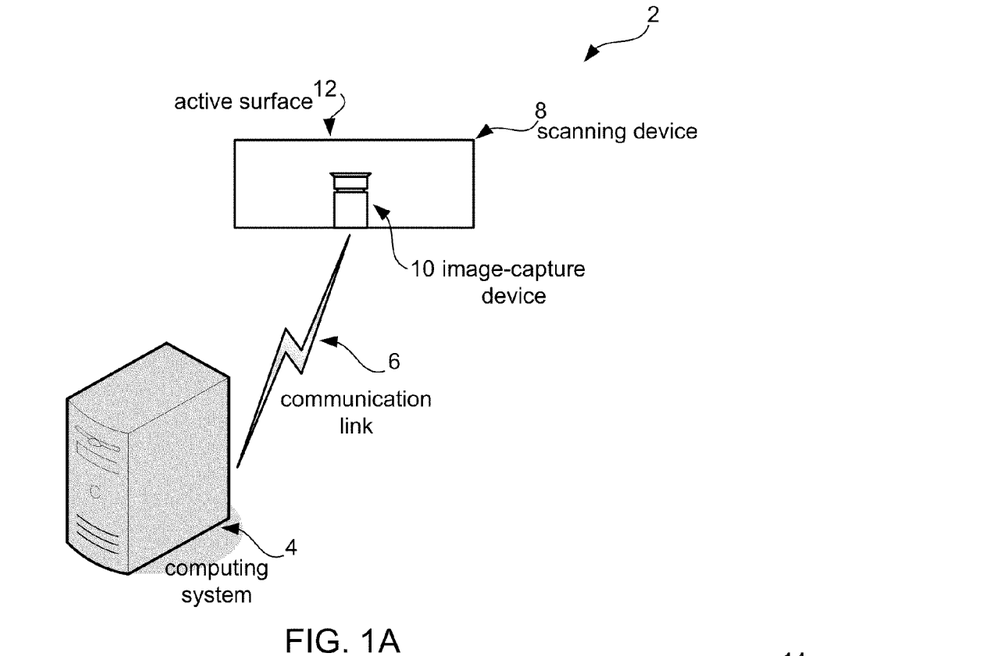
FIG. 1A is a picture depicting exemplary embodiments of the present invention comprising a scanning device communicatively coupled to a computing system, wherein the scanning device comprises an image-capture device and an active surface in a "look-up" configuration.

FIG. 1A depicts exemplary embodiments of the present invention comprising a scanner system 2 in a "look-up" configuration. The scanner system 2 may comprise a computing system 4 communicatively coupled, via a communication link 6, to a scanning device 8. Exemplary computing systems 4 may include stand-alone computing systems, distributed computing systems and other computing systems. In some embodiments of the present invention, the computing system 4 may comprise a memory storing instructions to be executed by the computing system 4. Exemplary communication links 6 may include wired, wireless and other communication links. The scanning device 8 may comprise an assembly that houses an image-capture device 10, for example, a camera, and a transparent imaging surface 12, referred to as an active surface, against, or near, which a planar or non-planar object to be scanned may be placed. The active surface 12 may be observed by the image-capture device 10, and when scan intent is detected, the object at, or near, the active surface 12 may be scanned. In some "look-up" configured embodiments of the present invention, the active surface 12 may be a portion of the top surface of the scanning device 8. In alternative "look-up" configured embodiments of the present invention (not shown), an active surface may be a portion of a surface, other than the top surface, of a scanning device, wherein the term "look-up" may refer to the configuration in which the image-capture device views an object to be scanned through the active surface.

Figure 1B:
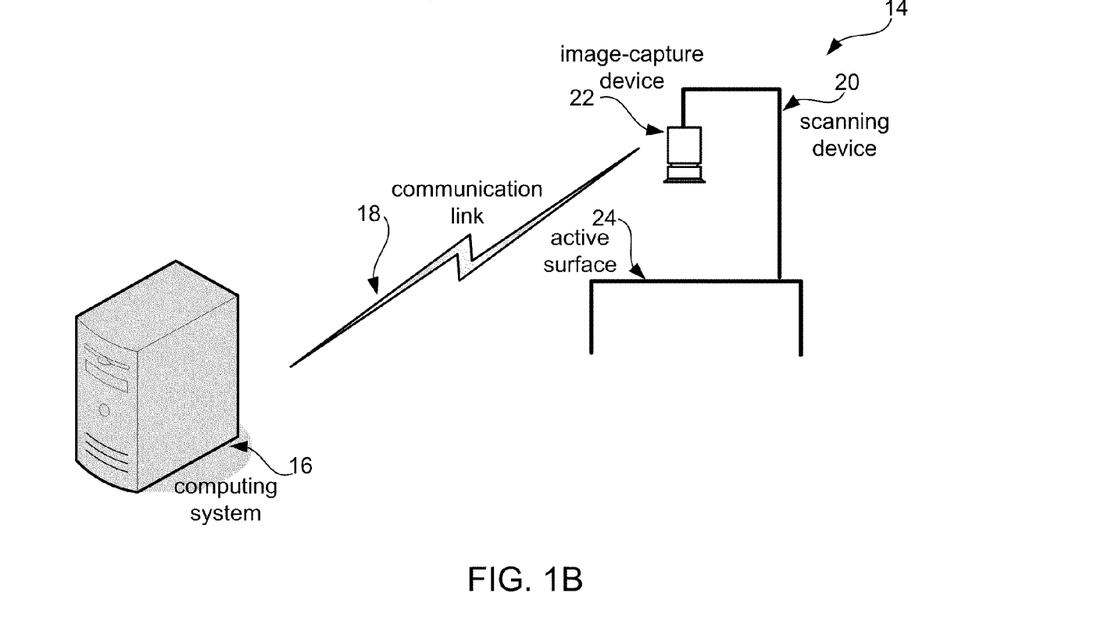
FIG. 1B is a picture depicting exemplary embodiments of the present invention comprising a scanning device communicatively coupled to a computing system, wherein the scanning device comprises an image-capture device and an active surface in a "look-down" configuration.

FIG. 1B depicts alternative embodiments of the present invention comprising a scanner system 14 in a "look-down" configuration. The scanner system 14 may comprise a computing system 16 communicatively coupled, via a communication link 18, to a scanning device 20. Exemplary computing systems 16 may include stand-alone computing systems, distributed computing systems and other computing systems. In some embodiments of the present invention, the computing system 16 may comprise a memory storing instructions to be executed by the computing system 16. Exemplary communication links 18 may include wired, wireless and other communication links. The scanning device 20 may comprise an assembly that positions an image-capture device 22, for example, a camera, above an imaging surface 24, referred to as an active surface, on, or near, which a planar or non-planar object to be scanned may be placed. The active surface 24 may be observed by the image-capture device 22, and when scan intent is detected, the object on, or near, the active surface 24 may be scanned. In some "look-down" configured embodiments of the present invention, the active surface 24 may be an opaque surface. In alternative "look-down" configured embodiments of the present invention, the active surface 24 may comprise a trans-illuminated surface, which may be useful in the acquisition of film-based objects, for example, overhead projector films, X-ray films, slides and other film-based image sources. The term "look-down" may refer to the configuration in which an object to be scanned may be placed between the image-capture device 22 and the active surface 24.

In both "look-up" configured and "look-down" configured embodiments of the present invention, the active surface may be associated with an active imaging region. Objects placed against the active surface or in the active imaging region, also considered near the active surface, may be scanned. In some embodiments of the present invention, the active imaging region may be associated with a region near to the focal plane of the image-capture device.

In alternative embodiments (not shown), a scanner system may comprise a computing system, for example, an embedded processor, embedded within a scanning device. The scanning device may comprise an assembly that houses an image-capture device and an imaging surface, referred to as an active surface, against, or near, which an object to be scanned may be placed. The active surface may be observed by the image-capture device, and when a scan intent is detected, the object at the active surface may be scanned. In some embodiments of the present invention, the active surface and the image-capture device may be configured in a "look-up" configuration. In alternative embodiments of the present invention, the active surface and the image-capture device may be configured in a "look-down" configuration.

In some embodiments (not shown), a scanning device may comprise an illuminator that may be activated prior to scanning.

In exemplary low-cost, "look-up" configured embodiments of the present invention, a scanning device may comprise two chambers: a lower chamber and an upper chamber. In some embodiments, a fluorescent illuminator may be positioned to provide illumination through a first cutout in the bottom of the lower chamber. In an alternative exemplary embodiment, the fluorescent illuminator may be replaced with one, or more, LEDs (Light Emitting Diodes) attached to the inside surfaces of the lower chamber. In some of these embodiments, the lower chamber may be wallpapered with copy bond paper to diffuse the LED illumination. A CMOS (Complementary Metal-Oxide Semiconductor) USB (Universal Serial Bus)-connected webcam may be positioned above the illuminator to view up towards the top of the assembly. The upper chamber, with a larger cutout on the top of the upper chamber, may be positioned on top of the lower chamber to adjust the distance between the camera and the larger cutout. The upper-chamber cutout may be covered with a clear, polyester, overhead transparency sheet, held in position with cellophane tape. The distance between the camera and the larger cutout may be adjusted to a distance suitable for in-focus capture of an object placed on, or near, the transparency-covered upper-chamber cutout. The transparent surface, of the scanning device, captured by the webcam is the active surface of the exemplary scanning device.

According to some embodiments of the present invention, when a scanning device is powered on, it may enter and remain at a low-power state until a user's intent to initiate a scan may be inferred by the scanner system. In some embodiments of the present invention, the inference may be made using images obtained by the image-capture device and communicated to the computing system.

According to alternative embodiments of the present invention, a proximity detector, for example, a photo sensor, a motion sensor or other sensor that may detect a change in conditions proximate to the location of the sensor, may be located on the scanning-device assembly. In these embodiments, when the image-capture device is powered down, a proximity event detected by the proximity detector may initiate a power-up process in the image-capture device, and in some embodiments, the proximity event may infer a user's intent to initiate a scan.

When an intent to scan is detected through active sensing, the scanning system may turn on the illumination source to facilitate a high-quality scan and may capture an image of the object placed against, or near, the active surface.

Figure 2:
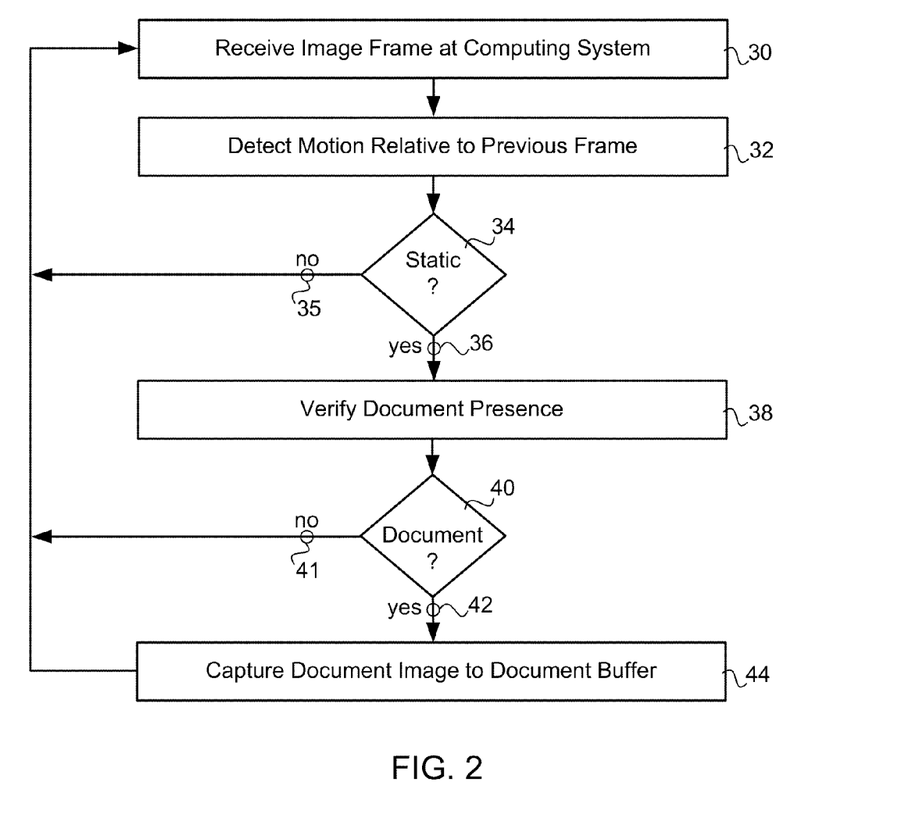
FIG. 2 is a chart showing exemplary embodiments of the present invention comprising detection of a static document image as a user intent to scan.

In some embodiments of the present invention described in relation to FIG. 2, active sensing may comprise receiving 30 an image frame, captured from an image-capture device in a scanning device, at a computing system. In some exemplary embodiments of the present invention, the image frame may be transported from the scanning device to the computing system via a USB connection. In alternative exemplary embodiments, the image frame may be transported internally within the scanning device to a computing system comprising an embedded processor. In yet alternative exemplary embodiments, the image frame may be transported wirelessly between the scanning device and the computing system.

Motion detection may be performed 32 between the received image frame and a previously captured image frame to determine if the image captured by the image-capture device has stabilized. In some embodiments of the present invention, the previously captured image frame may be stored in an internal buffer within the computing system. In alternative embodiments, the previously captured image frame may be stored outside of the computing system and communicated to the computing system in response to a computing-system request or accessed directly by the computing system.

In some embodiments of the present invention, motion detection 32 may comprise a frame-based motion sensor filter that performs a pixel-by-pixel comparison of the received image frame and the previously captured image frame.

In some embodiments, the frame-based motion sensor filter may track the number of significant pixel color changes between the two frames, the received image frame and the previously captured image frame. A pixel difference value, which may be denoted d, may be computed at each pixel location, indicated by i, according to:

$$d(i) = \left(2 + \frac{\mu_R^{(i)}}{256}\right) \cdot R_d^2(i) + 4 \cdot G_d^2(i) + \left(2 + \frac{(255 - \mu_R^{(i)})}{256}\right) \cdot B_d^2(i),$$

where $\mu_R^{(i)}$ denotes the mean of the red component value, at pixel location i, for the two frames, and $R_d^2(i)$, $G_d^2(i)$ and $B_d^2(i)$ denote the squared differences between the red, green and blue components at pixel location i, for the two frames, respectively. In alternative embodiments of the present invention, a pixel color difference may be computed according to alternative difference measures known in the art.

In alternative embodiments, the frame-based motion sensor filter may track the number of significant pixel luminance changes between the two frames. In some of these embodiments, the image-capture device may acquire grayscale image data, and the luminance values may be the grayscale values. In alternative of these embodiments, the image-capture device may acquire color image data, and the luminance values may be determined, according to methods well known in the art, from the color image data. A pixel difference value, which may be denoted d, may be computed at each pixel location, indicated by i, according to:

$$d(i) = Y_d^2(i),$$

where $Y_d^2(i)$ denotes the squared differences between luminance at pixel location i, for the two frames, respectively.

If the value of a pixel difference value d(i) meets a first criterion relative to a first threshold value, which may be denoted $T_d$, then the pixel at location i may be considered to have changed significantly, and a counter, which may be denoted c, may be incremented. In some embodiments of the present invention, the counter c may be incremented when:

$$d(i) > T_d.$$

In alternative embodiments of the present invention, the counter c may be incremented when:

$$d(i) \geq T_d.$$

In some embodiments of the present invention, $T_d$=10,000.

After determining the pixel difference value for each pixel, comparing the pixel difference value for each pixel to the threshold $T_d$ and appropriately incrementing the counter c, the counter value may be compared to a second threshold value, which may be denoted $T_c$, to determine 34 if the scene associated with the captured image may be static. In some embodiments, if the value of the counter c meets a first criterion relative to $T_c$, then the scene may be determined not to be static 35. If the value of the counter c does not meet the first criterion relative to the second threshold value, then the scene may be determined to be static 36. In some embodiments, the scene may be determined to be non-static 35 when:

$$c > T_c$$

and static 36 when $$c \leq T_c.$$

In alternative embodiments, the scene may be determined to be non-static 35 when:

$$c \geq T_c$$

and static 36 when $$c < T_c.$$

In some embodiments of the present invention, $T_c$=50.

When a scene is determined to be non-static 35, then subsequent processing of the received image frame may be skipped, and the active-sensing pipeline may continue to analyze captured image frames 30. If a scene is determined to be static 36, then document-presence verification 38 may be performed. Document-presence verification 38 may verify that the scanned object comprises document qualities, for example, high-frequency content characteristic of text, picture elements, line drawings and other content. Scanned objects that may comprise document qualities may include planar objects, non-planar objects and other objects. Exemplary planar objects may include document pages, fabric pieces, leaves and other objects that may be flattened on, or near, the active surface of the scanning system. Exemplary non-planar objects may include, bound volumes, three-dimensional objects comprising a label or other high-frequency content and other objects that may not readily be flattened on, or near, the active surface of the scanning system.

In some embodiments of the present invention, document-presence verification 38 may comprise a gradient filter that may respond to text edges and other high-frequency content that may be typical of document images. Exemplary gradient filters may comprise a Canny edge detector, a Sobel operator, a Laplace edge detector, a Robert's filter, a Prewitt filter, or other filters and detectors, known in the art, responsive to high-frequency content.

The response of the gradient filter for the current image frame may be compared 40 to reference edge data that may correspond to the edge content of an image, referred to as a reference image, of the unobstructed imaging surface. In some embodiments, the edge count in the current frame may be compared to the edge count in the reference image in a block-based comparison. In some embodiments, a substantive change in the number of edge pixels in one or more blocks may indicate that a document object has 42 likely been placed on, or near, the active surface. In some embodiments of the present invention, a change of 25%, or more, in the block edge count may indicate a substantive change. In alternative embodiments, a detection threshold other than 25% may be used. If all blocks have been processed without detecting a substantive change in edge pixels relative to the reference image, then the presence of a document object is not confirmed 41, and the active-sensing pipeline may continue to analyze captured image frames 30. Alternative document-verification methods known in the art may be used in alternative embodiments of the present invention.

If the presence of a document object is confirmed 42, then image data for the current frame may be captured 44 to a document buffer. In some embodiments of the present invention, the capture 44 of the current frame to the document buffer may comprise a transfer of the stored current frame to the document buffer. In alternative embodiments, the capture 44 of the current frame to the document buffer may comprise capturing, via the image-capture device, a current view. In some embodiments of the present invention, the capture 44 of the current view may be made through the image-capture device only when the active-sensing pipeline determines an adjustment to an image-capture device control may be required or when a second image-capture device may be available.

The captured image data may be made available, from the document buffer, for subsequent processing, for example, image enhancement, image compression, optical character recognition (OCR) analysis, and other image processing. The active-sensing pipeline may continue to analyze captured image frames 30.

Figure 3:
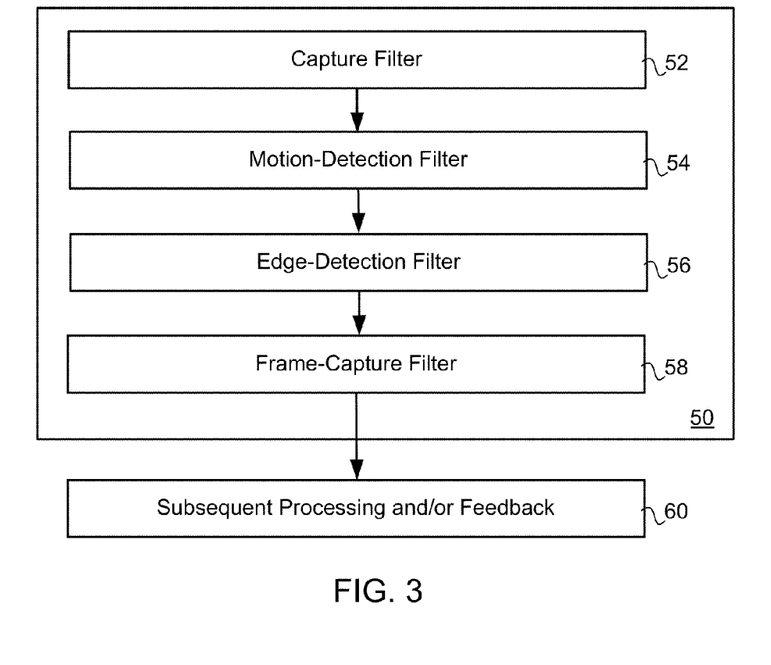
FIG. 3 is a chart showing exemplary embodiments of the present invention comprising a DirectShow graph implementation.

Some embodiments of the present invention described in relation to FIG. 3, may comprise an active-sensing pipeline 30 constructed using the Microsoft DirectShow API framework. The DirectShow video processing graph of the active-sensing pipeline 50 may comprise a capture filter 52 operatively coupled to a motion-detection filter 54. The motion-detection filter 54 may be operatively coupled to an edge-detection filter 56 which may be operatively coupled to a frame-capture filter. The results of the active-sensing pipeline may be made available 60 for subsequent processing, for example, image enhancement, image compression, OCR analysis, and other image processing, and/or may trigger user feedback, for example, audio feedback and visual feedback.

In some exemplary embodiments of the present invention, feedback to the user may be provided by an audio beep. In alternative embodiments, feedback to the user may be provided by a light-emitting diode (LED) flash. Alternative embodiments of the present invention may comprise a small display for providing visual feedback, for example, a thumbnail of the scanned content and other visual indicators. The display may also be used to verify scan and scanner routing information.

In some embodiments of the present invention, routing information, for example, an email address or other routing indicator, for a network scan may be extracted, by OCR or handwriting recognition, from a page on which a user has written, typed, or otherwise indicated the routing information, and scanned using the scanning device. In some embodiments, once routing information is extracted, all additional scans may be routed to the user-provided address until the user terminates the process through a predetermined cue, for example, placing a blank page on the active surface.

Some embodiments of the present invention may comprise an image-capture device with pan, tilt and zoom (PTZ) adjustment capabilities. In some embodiments, a first captured image may be content analyzed and based on the content analysis, the image-capture device may be panned to optimize sensor alignment with respect to the object, or objects, in the image. The image-capture device may be tilted to center the content in the field of view, and the image-capture device optics may be zoomed to nearly fill the sensor frame with the content.

Figure 4:
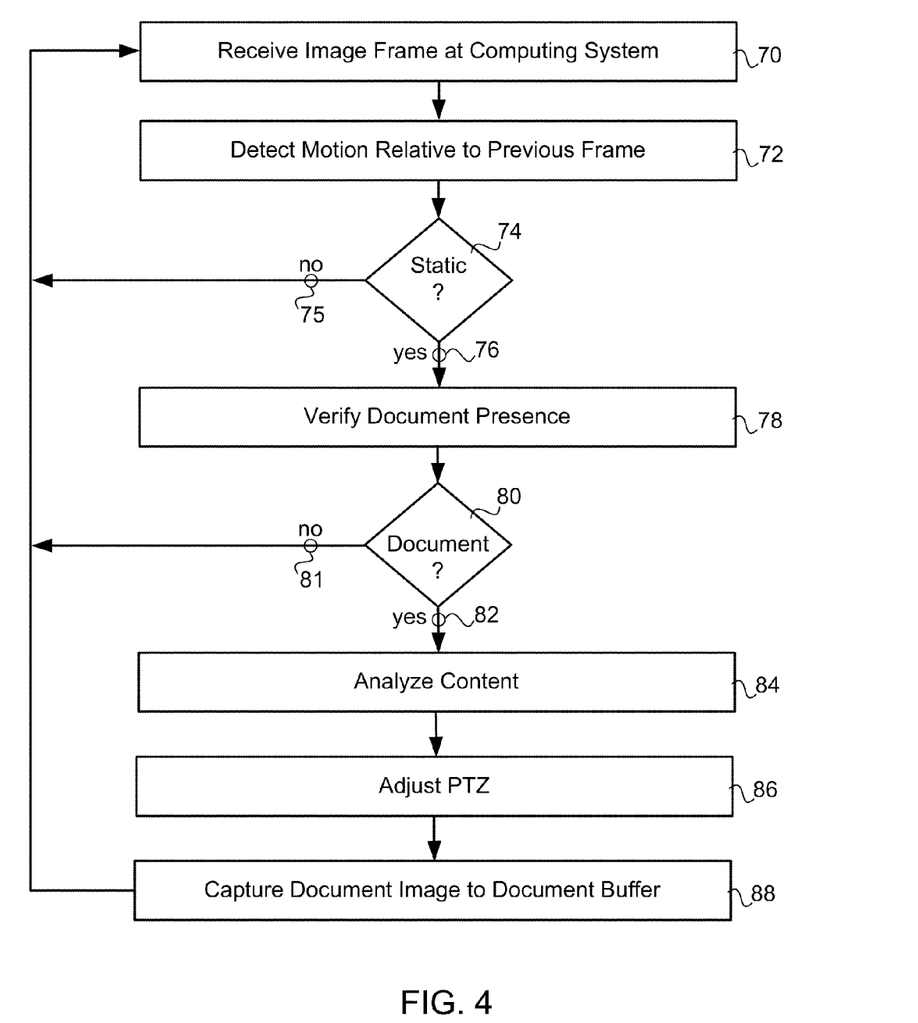
FIG. 4 is a chart showing exemplary embodiments of the present invention comprising a PZT-capable image-capture device.

Some embodiments of the present invention comprising a PTZ-capable image-capture device may be described in relation to FIG. 4. In these embodiments, active sensing may comprise receiving 70 an image frame, captured from a PTZ-capable image-capture device in a scanning device, at a computing system. In some exemplary embodiments of the present invention, the image frame may be transported from the scanning device to the computing system via a USB connection. In alternative exemplary embodiments, the image frame may be transported internally within the scanning device to a computing system comprising an embedded processor. In yet alternative exemplary embodiments, the image frame may be transported wirelessly between the scanning device and the computing system.

Motion detection may be performed 72 between the received image frame and a previously captured image frame to determine if the image captured by the PTZ-capable image-capture device has stabilized. In some embodiments of the present invention, the previously captured image frame may be stored in an internal buffer within the computing system. In alternative embodiments, the previously captured image frame may be stored outside of the computing system and communicated to the computing system in response to a computing-system request or accessed directly by the computing system.

In some embodiments of the present invention, motion detection 72 may comprise a frame-based motion sensor filter that performs a pixel-by-pixel comparison of the received image frame and the previously captured image frame.

In some embodiments, the frame-based motion sensor filter may track the number of significant pixel color changes between the two frames, the received image frame and the previously captured image frame. A pixel difference value, which may be denoted d, may be computed at each pixel location, indicated by i, according to:

$$d(i) = \left(2 + \frac{\mu_R^{(i)}}{256}\right) \cdot R_d^2(i) + 4 \cdot G_d^2(i) + \left(2 + \frac{(255 - \mu_R^{(i)})}{256}\right) \cdot B_d^2(i),$$

where $\mu_R^{(i)}$ denotes the mean of the red component value, at pixel location i, for the two frames, and $R_d^2(i)$, $G_d^2(i)$ and $B_d^2(i)$ denote the squared differences between the red, green and blue components at pixel location i, for the two frames, respectively. In alternative embodiments of the present invention, a pixel color difference may be computed according to alternative difference measures known in the art.

In alternative embodiments, the frame-based motion sensor filter may track the number of significant pixel luminance changes between the two frames. In some of these embodiments, the image-capture device may acquire grayscale image data, and the luminance values may be the grayscale values. In alternative of these embodiments, the image-capture device may acquire color image data, and the luminance values may be determined, according to methods well known in the art, from the color image data. A pixel difference value, which may be denoted d, may be computed at each pixel location, indicated by i, according to:

$$d(i) = Y_d^2(i),$$

where $Y_d^2(i)$ denotes the squared differences between luminance at pixel location i, for the two frames, respectively.

If the value of a pixel difference value d(i) meets a first criterion relative to a first threshold value, which may be denoted $T_d$, then the pixel at location i may be considered to have changed significantly, and a counter, which may be denoted c, may be incremented. In some embodiments of the present invention, the counter c may be incremented when:

$$d(i) > T_d.$$

In alternative embodiments of the present invention, the counter c may be incremented when:

$$d(i) \geq T_d.$$

In some embodiments of the present invention, $T_d = 10,000$.

After determining the pixel difference value for each pixel, comparing the pixel difference value for each pixel to the threshold $T_d$ and appropriately incrementing the counter c, the counter value may be compared to a second threshold value, which may be denoted $T_c$, to determine 74 if the scene associated with the captured image may be static. In some embodiments, if the value of the counter c meets a first criterion relative to $T_c$, then the scene may be determined not to be static 75. If the value of the counter c does not meet the first criterion relative to the second threshold value, then the scene may be determined to be static 76. In some embodiments, the scene may be determined to be non-static 75 when:

$$c > T_c$$

and static 76 when $$c \leq T_c.$$

In alternative embodiments, the scene may be determined to be non-static 75 when:

$$c \geq T_c$$

and static 76 when $$c < T_c.$$

In some embodiments of the present invention, $T_c = 50$.

When a scene is determined to be non-static 75, then subsequent processing of the received image frame may be skipped, and the active-sensing pipeline may continue to analyze captured image frames 70. If a scene is determined to be static 76, then document-presence verification 78 may be performed. Document-presence verification 78 may verify that the scanned object comprises document qualities, for example, high-frequency content characteristic of text, picture elements, line drawings and other content. Scanned objects that may comprise document qualities may include planar objects, non-planar objects and other objects. Exemplary planar objects may include document pages, fabric pieces, leaves and other objects that may be flattened on, or near, the active surface of the scanning system. Exemplary non-planar objects may include, bound volumes, three-dimensional objects comprising a label or other high-frequency content and other objects that may not readily be flattened on, or near, the active surface of the scanning system.

In some embodiments of the present invention, document-presence verification 78 may comprise a gradient filter that may respond to text edges and other high-frequency content that may be typical of document images. Exemplary gradient filters may comprise a Canny edge detector, a Sobel operator, a Laplace edge detector, a Robert's filter, a Prewitt filter, or other filters and detectors, known in the art, responsive to high-frequency content.

The response of the gradient filter for the current image frame may be compared 80 to reference edge data that may correspond to the edge content of an image, referred to as a reference image, of the unobstructed imaging surface. In some embodiments, the edge count in the current frame may be compared to the edge count in the reference image in a block-based comparison. In some embodiments, a substantive change in the number of edge pixels in one or more blocks may indicate that a document object has 82 likely been placed on, or near, the active surface. In some embodiments of the present invention, a change of 25%, or more, in the block edge count may indicate a substantive change. In alternative embodiments, a detection threshold other than 25% may be used. If all blocks have been processed without detecting a substantive change in edge pixels relative to the reference image, then the presence of a document object is not confirmed 81, and the active-sensing pipeline may continue to analyze captured image frames 70. Alternative document-verification methods known in the art may be used in alternative embodiments of the present invention.

If the presence of a document object is confirmed 82, then the content of the current frame may be analyzed 84, and the pan, zoom and tilt adjustments on the PZT-capable image-capture device may be adjusted 86 to optimize sensor alignment with respect to the object, or objects, in the image, to center the content in the field of view and to nearly fill the sensor frame with the content. Then image data for the current frame may be actively captured 88 to a document buffer via the image-capture device. The captured image data may be made available, from the document buffer, for subsequent processing, for example, image enhancement, image compression, optical character recognition (OCR) analysis, and other image processing. The active-sensing pipeline may continue to analyze captured image frames 80.

Some embodiments of the present invention may comprise a first image-capture device and a second image-capture device. At least one characteristic of the first image-capture device and the second image-capture device may be different. In one exemplary embodiment, the first image-capture device may capture images at a lower spatial resolution than the second image-capture device. In another exemplary embodiment, the first image-capture device may capture images at a higher frame rate than the second image-capture device. In another exemplary embodiment, the first image-capture device may capture images at both a lower spatial resolution and a higher frame rate than the second image-capture device.

Figure 5:
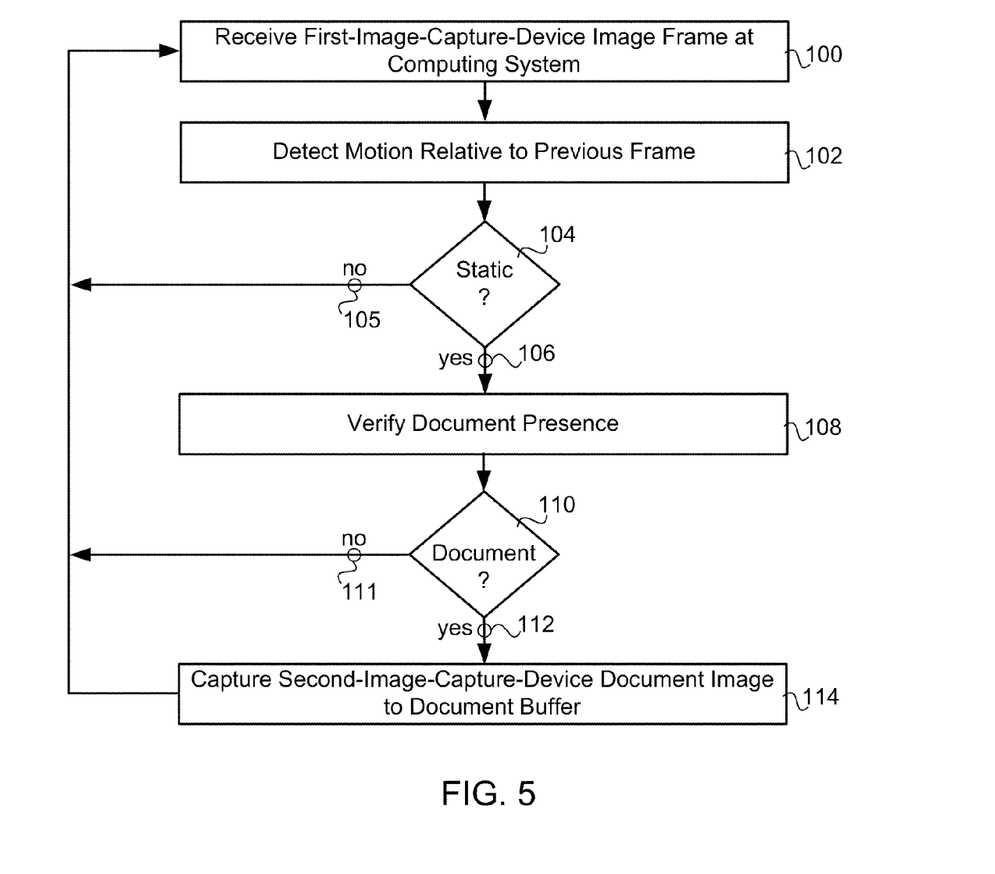
FIG. 5 is a chart showing exemplary embodiments of the present invention comprising two image-capture devices.

Embodiments of the present invention comprising two image-capture devices may be understood in relation to FIG. 5. In these embodiments, active sensing may comprise receiving 100 an image frame, captured from a first image-capture device in a scanning device, at a computing system. In some exemplary embodiments of the present invention, the image frame may be transported from the scanning device to the computing system via a USB connection. In alternative exemplary embodiments, the image frame may be transported internally within the scanning device to a computing system comprising an embedded processor. In yet alternative exemplary embodiments, the image frame may be transported wirelessly between the scanning device and the computing system.

Motion detection may be performed 102 between the received image frame and a previously captured image frame to determine if the image captured by the first image-capture device has stabilized. In some embodiments of the present invention, the previously captured image frame may be stored in an internal buffer within the computing system. In alternative embodiments, the previously captured image frame may be stored outside of the computing system and communicated to the computing system in response to a computing-system request or accessed directly by the computing system.

In some embodiments of the present invention, motion detection 102 may comprise a frame-based motion sensor filter that performs a pixel-by-pixel comparison of the received image frame and the previously captured image frame.

In some embodiments, the frame-based motion sensor filter may track the number of significant pixel color changes between the two frames, the received image frame and the previously captured image frame. A pixel difference value, which may be denoted d, may be computed at each pixel location, indicated by i, according to:

$$d(i) = \left(2 + \frac{\mu_R^{(i)}}{256}\right) \cdot R_d^2(i) + 4 \cdot G_d^2(i) + \left(2 + \frac{(255 - \mu_R^{(i)})}{256}\right) \cdot B_d^2(i),$$

where $\mu_R^{(i)}$ denotes the mean of the red component value, at pixel location i, for the two frames, and $R_d^2(i)$, $G_d^2(i)$ and $B_d^2(i)$ denote the squared differences between the red, green and blue components at pixel location i, for the two frames, respectively. In alternative embodiments of the present invention, a pixel color difference may be computed according to alternative difference measures known in the art.

In alternative embodiments, the frame-based motion sensor filter may track the number of significant pixel luminance changes between the two frames. In some of these embodiments, the image-capture device may acquire grayscale image data, and the luminance values may be the grayscale values. In alternative of these embodiments, the image-capture device may acquire color image data, and the luminance values may be determined, according to methods well known in the art, from the color image data. A pixel difference value, which may be denoted d, may be computed at each pixel location, indicated by i, according to:

$$d(i) = Y_d^2(i),$$

where $Y_d^2(i)$ denotes the squared differences between luminance at pixel location i, for the two frames, respectively.

If the value of a pixel difference value d(i) meets a first criterion relative to a first threshold value, which may be denoted $T_d$, then the pixel at location i may be considered to have changed significantly, and a counter, which may be denoted c, may be incremented. In some embodiments of the present invention, the counter c may be incremented when:

$$d(i) > T_d.$$

In alternative embodiments of the present invention, the counter c may be incremented when:

$$d(i) \geq T_d.$$

In some embodiments of the present invention, $T_d=10,000$.

After determining the pixel difference value for each pixel, comparing the pixel difference value for each pixel to the threshold $T_d$ and appropriately incrementing the counter c, the counter value may be compared to a second threshold value, which may be denoted $T_c$, to determine 104 if the scene associated with the captured image may be static. In some embodiments, if the value of the counter c meets a first criterion relative to $T_c$, then the scene may be determined not to be static 105. If the value of the counter c does not meet the first criterion relative to the second threshold value, then the scene may be determined to be static 106. In some embodiments, the scene may be determined to be non-static 105 when:

$$c > T_c$$

and static 106 when $$c < T_c.$$

In alternative embodiments, the scene may be determined to be non-static 105 when:

$$c \geq T_c$$

and static 106 when $$c < T_c.$$

In some embodiments of the present invention, $T_c=50$.

When a scene is determined to be non-static 105, then subsequent processing of the received image frame may be skipped, and the active-sensing pipeline may continue to analyze captured image frames 100. If a scene is determined to be static 106, then document-presence verification 108 may be performed. Document-presence verification 108 may verify that the scanned object comprises document qualities, for example, high-frequency content characteristic of text, picture elements, line drawings and other content. Scanned objects that may comprise document qualities may include planar objects, non-planar objects and other objects. Exemplary planar objects may include document pages, fabric pieces, leaves and other objects that may be flattened on, or near, the active surface of the scanning system. Exemplary non-planar objects may include, bound volumes, three-dimensional objects comprising a label or other high-frequency content and other objects that may not readily be flattened on, or near, the active surface of the scanning system.

In some embodiments of the present invention, document-presence verification 108 may comprise a gradient filter that may respond to text edges and other high-frequency content that may be typical of document images. Exemplary gradient filters may comprise a Canny edge detector, a Sobel operator, a Laplace edge detector, a Robert's filter, a Prewitt filter, or other filters and detectors, known in the art, responsive to high-frequency content.

The response of the gradient filter for the current image frame may be compared 110 to reference edge data that may correspond to the edge content of an image, referred to as a reference image, of the unobstructed imaging surface. In some embodiments, the edge count in the current frame may be compared to the edge count in the reference image in a block-based comparison. In some embodiments, a substantive change in the number of edge pixels in one or more blocks may indicate that a document object has 112 likely been placed on, or near, the active surface. In some embodiments of the present invention, a change of 25%, or more, in the block edge count may indicate a substantive change. In alternative embodiments, a detection threshold other than 25% may be used. If all blocks have been processed without detecting a substantive change in edge pixels relative to the reference image, then the presence of a document object is not confirmed 111, and the active-sensing pipeline may continue to analyze captured image frames 100. Alternative document-verification methods known in the art may be used in alternative embodiments of the present invention.

If the presence of a document object is confirmed 112, then image data for the current frame may be captured 144 from the second image-capture device to a document buffer. The second image-capture device captured image data may be made available, from the document buffer, for subsequent processing, for example, image enhancement, image compression, optical character recognition (OCR) analysis, and other image processing. The active-sensing pipeline may continue to analyze captured image frames 100.

Some embodiments of the present invention may comprise two image-capture devices of which, at least, the second image-capture device may be PTZ capable. Some of these embodiments may be understood in relation to FIG. 6. In these embodiments, active sensing may comprise receiving 120 an image frame, captured from a first image-capture device in a scanning device, at a computing system. In some exemplary embodiments of the present invention, the image frame may be transported from the scanning device to the computing system via a USB connection. In alternative exemplary embodiments, the image frame may be transported internally within the scanning device to a computing system comprising an embedded processor. In yet alternative exemplary embodiments, the image frame may be transported wirelessly between the scanning device and the computing system.

Figure 6:
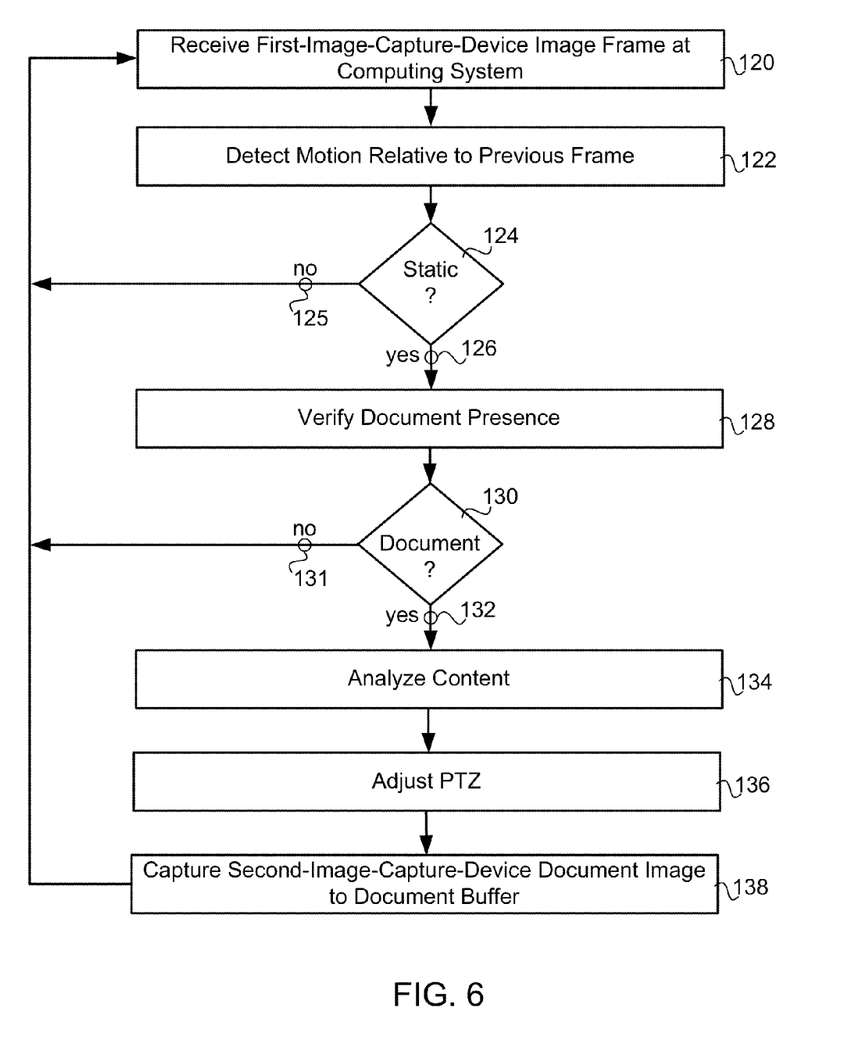
FIG. 6 is a chart showing exemplary embodiments of the present invention comprising two image-capture devices, wherein one of the image-capture devices is a PZT-capable image-capture device.

Motion detection may be performed 122 between the received image frame and a previously captured image frame to determine if the image captured by the first image-capture device has stabilized. In some embodiments of the present invention, the previously captured image frame may be stored in an internal buffer within the computing system. In alternative embodiments, the previously captured image frame may be stored outside of the computing system and communicated to the computing system in response to a computing-system request or accessed directly by the computing system.

In some embodiments of the present invention, motion detection 132 may comprise a frame-based motion sensor filter that performs a pixel-by-pixel comparison of the received image frame and the previously captured image frame.

In some embodiments, the frame-based motion sensor filter may track the number of significant pixel color changes between the two frames, the received image frame and the previously captured image frame. A pixel color difference, which may be denoted d, may be computed at each pixel location, indicated by i, according to:

$$d(i) = \left(2 + \frac{\mu_R^{(i)}}{256}\right) \cdot R_d^2(i) + 4 \cdot G_d^2(i) + \left(2 + \frac{(255 - \mu_R^{(i)})}{256}\right) \cdot B_d^2(i),$$

where $\mu_R^{(i)}$ denotes the mean of the red component value, at pixel location i, for the two frames, and $R_d^2(i)$, $G_d^2(i)$ and $B_d^2(i)$ denote the squared differences between the red, green and blue components at pixel location i, for the two frames, respectively. In alternative embodiments of the present invention, a pixel color difference may be computed according to alternative difference measures known in the art.

In alternative embodiments, the frame-based motion sensor filter may track the number of significant pixel luminance changes between the two frames. In some of these embodiments, the image-capture device may acquire grayscale image data, and the luminance values may be the grayscale values. In alternative of these embodiments, the image-capture device may acquire color image data, and the luminance values may be determined, according to methods well known in the art, from the color image data. A pixel difference value, which may be denoted d, may be computed at each pixel location, indicated by i, according to:

$$d(i) = Y_d^2(i),$$

where $Y_d^2(i)$ denotes the squared differences between luminance at pixel location i, for the two frames, respectively.

If the value of a pixel difference value d(i) meets a first criterion relative to a first threshold value, which may be denoted $T_d$, then the pixel at location i may be considered to have changed significantly, and a counter, which may be denoted c, may be incremented. In some embodiments of the present invention, the counter c may be incremented when:

$$d(i) > T_d.$$

In alternative embodiments of the present invention, the counter c may be incremented when:

$$d(i) \geq T_d.$$

In some embodiments of the present invention, $T_d$=10,000.

After determining the pixel difference value for each pixel, comparing the pixel difference value for each pixel to the threshold $T_d$ and appropriately incrementing the counter c, the counter value may be compared to a second threshold value, which may be denoted $T_c$, to determine 124 if the scene associated with the captured image may be static. In some embodiments, if the value of the counter c meets a first criterion relative to $T_c$, then the scene may be determined not to be static 125. If the value of the counter c does not meet the first criterion relative to the second threshold value, then the scene may be determined to be static 126. In some embodiments, the scene may be determined to be non-static 125 when:

$$c > T_c$$

and static 126 when $$c \leq T_c.$$

In alternative embodiments, the scene may be determined to be non-static 125 when:

$$c \geq T_c$$

and static 126 when $$c < T_c.$$

In some embodiments of the present invention, $T_c$=50.

When a scene is determined to be non-static 125, then subsequent processing of the received image frame may be skipped, and the active-sensing pipeline may continue to analyze captured image frames 120. If a scene is determined to be static 126, then document-presence verification 128 may be performed. Document-presence verification 128 may verify that the scanned object comprises document qualities, for example, high-frequency content characteristic of text, picture elements, line drawings and other content. Scanned objects that may comprise document qualities may include planar objects, non-planar objects and other objects. Exemplary planar objects may include document pages, fabric pieces, leaves and other objects that may be flattened on, or near, the active surface of the scanning system. Exemplary non-planar objects may include, bound volumes, three-dimensional objects comprising a label or other high-frequency content and other objects that may not readily be flattened on, or near, the active surface of the scanning system.

In some embodiments of the present invention, document-presence verification 128 may comprise a gradient filter that may respond to text edges and other high-frequency content that may be typical of document images. Exemplary gradient filters may comprise a Canny edge detector, a Sobel operator, a Laplace edge detector, a Robert's filter, a Prewitt filter, or other filters and detectors, known in the art, responsive to high-frequency content.

The response of the gradient filter for the current image frame may be compared 130 to reference edge data that may correspond to the edge content of an image, referred to as a reference image, of the unobstructed imaging surface. In some embodiments, the edge count in the current frame may be compared to the edge count in the reference image in a block-based comparison. In some embodiments, a substantive change in the number of edge pixels in one or more blocks may indicate that a document object has 132 likely been placed on, or near, the active surface. In some embodiments of the present invention, a change of 25%, or more, in the block edge count may indicate a substantive change. In alternative embodiments, a detection threshold other than 25% may be used. If all blocks have been processed without detecting a substantive change in edge pixels relative to the reference image, then the presence of a document object is not confirmed 131, and the active-sensing pipeline may continue to analyze captured image frames 120. Alternative document-verification methods known in the art may be used in alternative embodiments of the present invention.

If the presence of a document object is confirmed 132, then the content of the current frame may be analyzed 134, and the pan, zoom and tilt adjustments on the PZT-capable second image-capture device may be adjusted 136 to optimize sensor alignment with respect to the object, or objects, in the image, to center the content in the field of view and to nearly fill the sensor frame with the content. Then image data for the current frame may be captured 138 to a document buffer using the second image-capture device. The captured image data may be made available, from the document buffer, for subsequent processing, for example, image enhancement, image compression, optical character recognition (OCR) analysis, and other image processing. The active-sensing pipeline may continue to analyze captured image frames 120.

In some embodiments of the present invention, optical-flow information between a received image frame and a reference image may be used to determine scan intent in an active-sensing pipeline. These embodiments may provide improved discrimination of scan intent over the pixel-based motion detection in the above-described embodiments of the present invention. Embodiments of the present invention comprising optical-flow analysis may be useful in reducing the effects of slight movements, for example, the movements which may be generated when a user is placing a bound volume on or holding a bound volume near an active surface. The motion trajectories associated with holding a bound volume may be random. Alternatively, in situations where a user may be placing multiple objects, for example, business cards, on the active surface to scan the multiple objects at one time, the motion trajectories may be consistent between a current image and previous image.

Figure 7:
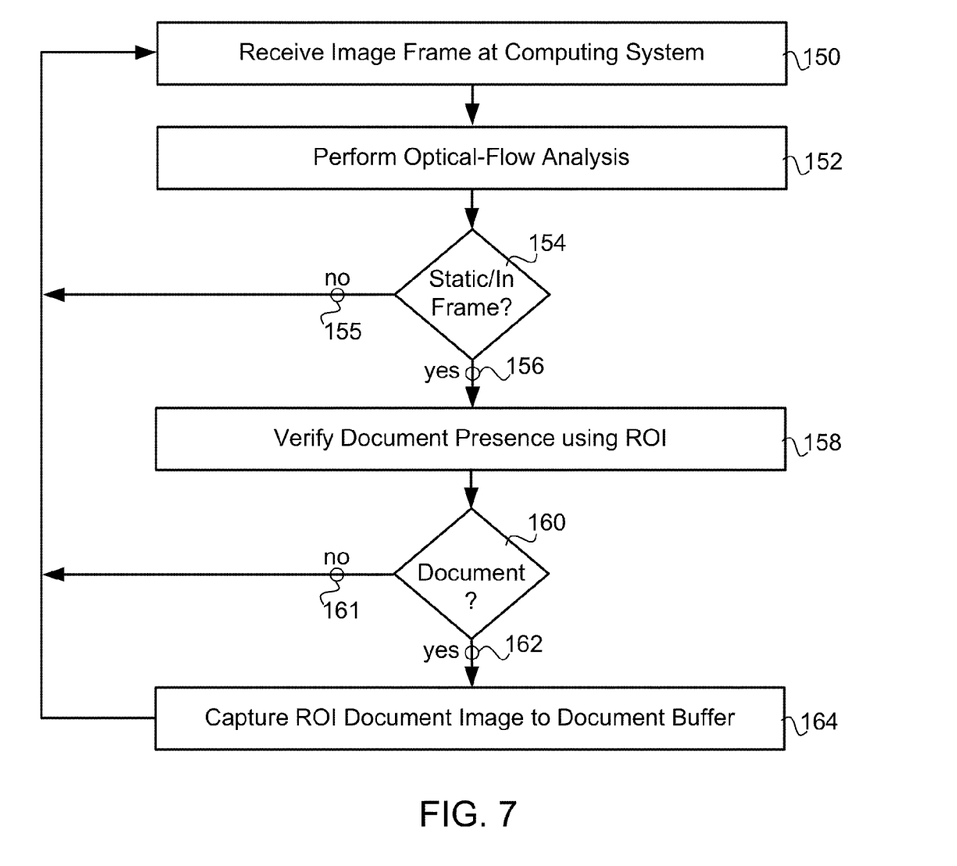
FIG. 7 is a chart showing exemplary embodiments of the present invention comprising optical-flow analysis.

Some embodiments of the present invention comprising optical-flow analysis may be described in relation to FIG. 7. In these embodiments, active sensing may comprise receiving 150 an image frame, captured from an image-capture device in a scanning device, at a computing system. In some exemplary embodiments of the present invention, the image frame may be transported from the scanning device to the computing system via a USB connection. In alternative exemplary embodiments, the image frame may be transported internally within the scanning device to a computing system comprising an embedded processor. In yet alternative exemplary embodiments, the image frame may be transported wirelessly between the scanning device and the computing system.

Optical-flow analysis may be performed 152 between the received image frame and a previously captured image frame to determine if the image captured by the image-capture device has stabilized and if static tracking points corresponding to previously moving points remain in the frame. In some embodiments of the present invention, Lucas-Kanade optical-flow estimation may be used to estimate the optical-flow field. In alternative embodiments of the present invention, other optical-flow field estimation techniques known in the art may be used. In some embodiments of the present invention, the previously captured image frame may be stored in an internal buffer within the computing system. In alternative embodiments, the previously captured image frame may be stored outside of the computing system and communicated to the computing system in response to a computing-system request or accessed directly by the computing system.

When a scene is determined 154 to be moving 155, then subsequent processing of the received image frame may be skipped, and the active-sensing pipeline may continue to analyze captured image frames 150. If a scene is determined to be substantially static 156, then document-presence verification 158 may be performed. Document-presence verification 1588 may verify that the scanned object comprises document qualities, for example, high-frequency content characteristic of text, picture elements, line drawings and other content. Scanned objects that may comprise document qualities may include planar objects, non-planar objects and other objects. Exemplary planar objects may include document pages, fabric pieces, leaves and other objects that may be flattened on, or near, the active surface of the scanning system. Exemplary non-planar objects may include, bound volumes, three-dimensional objects comprising a label or other high-frequency content and other objects that may not readily be flattened on, or near, the active surface of the scanning system.

In some embodiments of the present invention, document-presence verification 158 may be limited to a region-of-interest (ROI) associated with a plurality of feature points determined in the optical-flow analysis. The corners of the document boundary may be detected as feature points by the optical-flow analysis 152. A bounding box may be fit to the extent of the feature points. In some embodiments of the present invention, a region-of-interest may be defined in relation to the bounding box. In some embodiments, the bounding box may be expanded in each of the image directions by a fixed percentage, for example, 15%, to define a candidate document ROI. The fixed percentage expansion factor may be determined to ensure that the document may be captured in its entirety accounting for document skew in relation to the image sample grid.

In some embodiments of the present invention, document-presence verification 158 may comprise a gradient filter that may respond to text edges and other high-frequency content that may be typical of document images. Exemplary gradient filters may comprise a Canny edge detector, a Sobel operator, a Laplace edge detector, a Robert's filter, a Prewitt filter, or other filters and detectors, known in the art, responsive to high-frequency content.

The response of the gradient filter for the current image frame may be compared 160 to reference edge data that may correspond to the edge content of an image, referred to as a reference image, of the unobstructed imaging surface. In some embodiments, the edge count in the current frame may be compared to the edge count in the reference image in a block-based comparison. In some embodiments, a substantive change in the number of edge pixels in one or more blocks may indicate that a document object has 162 likely been placed on, or near, the active surface. In some embodiments of the present invention, a change of 25%, or more, in the block edge count may indicate a substantive change. In alternative embodiments, a detection threshold other than 25% may be used. If all blocks have been processed without detecting a substantive change in edge pixels relative to the reference image, then the presence of a document object is not confirmed 161, and the active-sensing pipeline may continue to analyze captured image frames 150.

If the presence of a document object is confirmed 162, then image data for the current frame ROI may be captured 164 to a document buffer. The captured image data may be made available, from the document buffer, for subsequent processing, for example, image enhancement, image compression, optical character recognition (OCR) analysis, and other image processing. The active-sensing pipeline may continue to analyze captured image frames 150.

Figure 8:
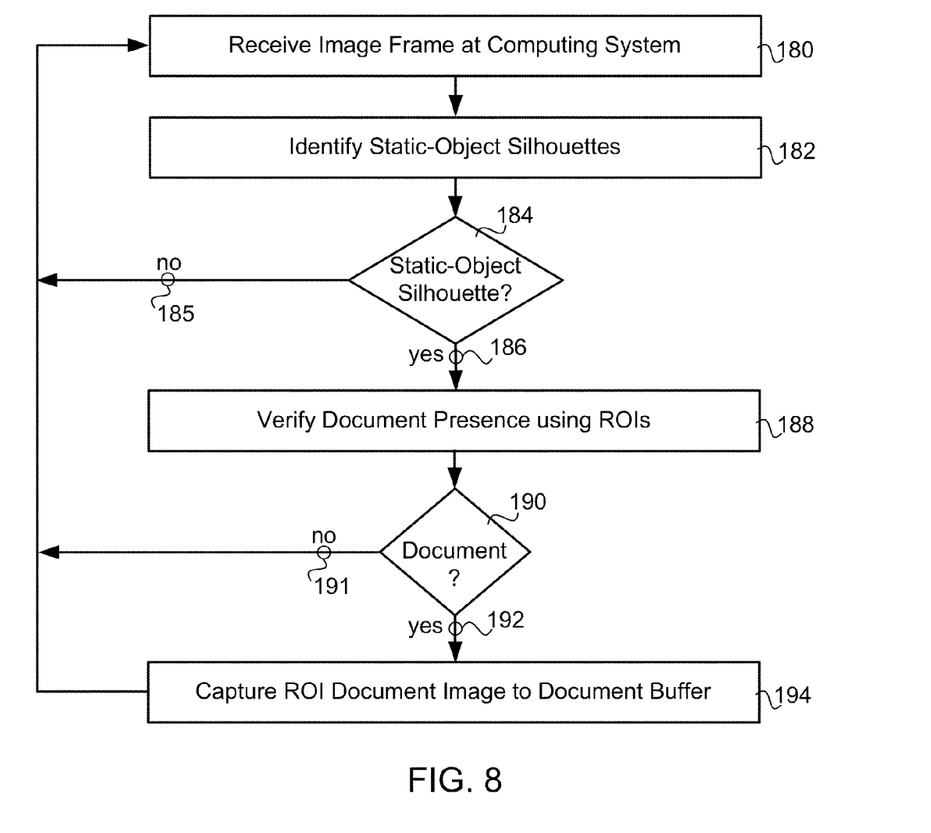
FIG. 8 is a chart showing exemplary embodiments of the present invention comprising a document tracking motion template.

In some embodiments of the present invention described in relation to FIG. 8, an image associated with the active surface may be segmented into several candidate regions to facilitate the tracking and separation of multiple documents, for example, business cards or receipts, placed on the active surface for scanning in a single scan. In these embodiments, active sensing may comprise receiving 180 an image frame, captured from an image-capture device in a scanning device, at a computing system. In some exemplary embodiments of the present invention, the image frame may be transported from the scanning device to the computing system via a USB connection. In alternative exemplary embodiments, the image frame may be transported internally within the scanning device to a computing system comprising an embedded processor. In yet alternative exemplary embodiments, the image frame may be transported wirelessly between the scanning device and the computing system.

Static-object silhouettes may be identified 182 by analysis of scene motion, between captured images over time. A motion template algorithm, for example, the algorithm taught by A. Bobick and J. Davis in "Real-time recognition of activity using temporal templates," IEEE Workshop on Applications of Computer Vision, pp. 39-42, December 1996 and other motion template algorithms known in the art, may be used in some embodiments of the present invention to identify object silhouettes using frame-by-frame differencing between the current image frame and a previously captured image frame. In alternative embodiments, subtraction of a background image determined from the reference image may be subtracted from the received image frame to identify 182 static-object silhouettes.

For each static-object silhouette 186, document-presence verification 188 may be performed in a region-of-interest (ROI) associated with the static-object silhouette. Document-presence verification 188 may verify that the scanned object comprises document qualities, for example, high-frequency content characteristic of text, picture elements, line drawings and other content. Scanned objects that may comprise document qualities may include planar objects, non-planar objects and other objects. Exemplary planar objects may include document pages, fabric pieces, leaves and other objects that may be flattened on, or near, the active surface of the scanning system. Exemplary non-planar objects may include, bound volumes, three-dimensional objects comprising a label or other high-frequency content and other objects that may not readily be flattened on, or near, the active surface of the scanning system.

In some embodiments of the present invention, document-presence verification 188 may comprise a gradient filter that may respond to text edges and other high-frequency content that may be typical of document images. Exemplary gradient filters may comprise a Canny edge detector, a Sobel operator, a Laplace edge detector, a Robert's filter, a Prewitt filter, or other filters and detectors, known in the art, responsive to high-frequency content.

The response of the gradient filter for the current image frame may be compared 190 to reference edge data that may correspond to the edge content in the ROI of an image, referred to as a reference image, of the unobstructed imaging surface. In some embodiments, the edge count in the current frame may be compared to the edge count in the reference image in a block-based comparison. In some embodiments, a substantive change in the number of edge pixels in one or more blocks may indicate that a document object has 192 likely been placed on, or near, the active surface in the region associated with the ROI. In some embodiments of the present invention, a change of 25%, or more, in the block edge count may indicate a substantive change. In alternative embodiments, a detection threshold other than 25% may be used. If all blocks have been processed without detecting a substantive change in edge pixels relative to the reference image, then the presence of a document object is not confirmed 191, and the active-sensing pipeline may continue to analyze captured image frames 180. A document-verified region may be captured 194 to a document image buffer, and after all static-object silhouettes have been processed, then the active-sensing pipeline may continue to analyzed captured image frames 180.

In some embodiments of the present invention, the document-verified ROIs may be cached until the entire image frame is static. In some of these embodiments, the ROIs may be composited to a single electronic document for routing. In alternative embodiments, the cached ROIs may be routed as a multi-page document. In yet alternative embodiments, each region may be routed individually as it is captured.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A computer-implemented method for capturing a document, said method comprising:
   receiving, at a computing system, an image frame from a first image-capture device;
   comparing said received image frame with a previously captured image frame, wherein said comparing comprises one selected from the group consisting of motion filtering and determining the optical flow between said received image frame and said previously captured image frame;
   when said comparison indicates that said received image frame has stabilized relative to said previously captured image frame, determining if said received image frame is associated with a document; and
   when said determining indicates that said received image frame is associated with a document, capturing a document image associated with said image frame to a document buffer.

2. A method as described in claim 1, wherein said capturing a document image associated with said image frame to a document buffer comprises a transfer of said received image frame to said document buffer.

3. A method as described in claim 1 further comprising routing said captured document image to a first recipient.

4. A method as described in claim 3, wherein said first recipient is determined from a captured routing image, wherein said captured routing image is captured prior to said receiving.

5. A computer-implemented method for capturing a document, said method comprising:
   receiving, at a computing system, an image frame from a first image-capture device;

comparing said received image frame with a previously captured image frame;

when said comparison indicates that said received image frame has stabilized relative to said previously captured image frame, determining if said received image frame is associated with a document; and when said determining indicates that said received image frame is associated with a document:

capturing, using a second image-capture device, wherein said second image capture device comprises at least one of a pan adjustment control, a tilt adjustment control and a zoom adjustment control, a document image associated with said image frame to a document buffer;

analyzing said received image frame for content placement; and adjusting, prior to said capturing, at least one of said pan adjustment control, said tilt adjustment control and said zoom adjustment control in response to said content placement.

6. A method as described in claim 5 further comprising routing said captured document image to a first recipient.

7. A method as described in claim 6, wherein said first recipient is determined from a captured routing image, wherein said captured routing image is captured prior to said receiving.

8. A computer-implemented method for capturing a document, said method comprising:

receiving, at a computing system, an image frame from a first image-capture device;

comparing said received image frame with a previously captured image frame;

when said comparison indicates that said received image frame has stabilized relative to said previously captured image frame, determining if said received image frame is associated with a document, wherein said determining if said received image frame is associated with a document comprises:

determining the high-frequency content of said received image frame; and comparing said high-frequency content of said received image frame with the high-frequency content of a reference image frame, wherein said reference image frame is associated with an unobstructed view of an active surface of a scanning device associated with said first image-capture device; and when said determining indicates that said received image frame is associated with a document capturing a document image associated with said image frame to a document buffer.

9. A method as described in claim 8, wherein said determining said high-frequency content of said received image frame comprises gradient filtering said received image frame.

10. A method as described in claim 8 further comprising routing said captured document image to a first recipient.

11. A method as described in claim 10, wherein said first recipient is determined from a captured routing image, wherein said captured routing image is captured prior to said receiving.

12. A computer-implemented method for capturing a document, said method comprising:

receiving, at a computing system, an image frame from a first image-capture device, wherein said first image-capture device comprises at least one of a pan adjustment control, a tilt adjustment control and a zoom adjustment control;

comparing said received image frame with a previously captured image frame;

when said comparison indicates that said received image frame has stabilized relative to said previously captured image frame, determining if said received image frame is associated with a document; and when said determining indicates that said received image frame is associated with a document:

capturing, using said first image-capture device, a document image associated with said image frame to a document buffer;

analyzing said received image frame for content placement; and adjusting, prior to said capturing, at least one of said pan adjustment control, said tilt adjustment control and said zoom adjustment control in response to said content placement.

13. A method as described in claim 12 further comprising routing said captured document image to a first recipient.

14. A method as described in claim 13, wherein said first recipient is determined from a captured routing image, wherein said captured routing image is captured prior to said receiving.

15. A system for scanning a document, said system comprising:

a first image-capture device;

an active surface; and a computing system communicatively coupled to said first image-capture device, wherein said computing system comprises a memory storing instructions to be executed by said computing system to:

receive an image frame from said first image-capture device;

compare said received image frame with a previously captured image frame, wherein said instructions to compare said received image frame with said previously captured image frame comprise instructions to calculate a pixel color difference, at each pixel location in said received image frame, between said received image frame and said previously captured image frame;

when said comparison indicates that said received image frame has stabilized relative to said previously captured image frame, determine if said received image frame is associated with a document; and when said determining indicates that said received image frame is associated with a document, capture a document image associated with said image frame to a document buffer.

16. A system as described in claim 15, wherein said instructions to capture a document image associated with said image frame to a document buffer comprise instructions to transfer said image frame to said document buffer.

17. A system as described in claim 15, wherein said first image-capture device comprises at least one of a pan adjustment control, a tilt adjustment control and a zoom adjustment control.

18. A system as described in claim 17, wherein said memory stores additional instructions to be executed by said computing system to:

analyze said received image frame for content placement; and adjust, prior to said capturing, at least one of said pan adjustment control, said tilt adjustment control and said zoom adjustment control in response to said content placement.

19. A system as described in claim 15, wherein said instructions to determine if said received image frame is associated with a document comprise instructions to:
- calculate the high-frequency content of said received image frame; and
- compare said high-frequency content of said received image frame with the high-frequency content of a reference image frame, wherein said reference image frame is associated with an unobstructed view of said active surface.

20. A system as described in claim 19, wherein said instructions to calculate the high-frequency content of said received image frame comprise instructions to calculate a gradient of said received image frame.

21. A system as described in claim 15 further comprising a second image-capture device.

22. A system as described in claim 21, wherein said instructions to capture a document image associated with said image frame to a document buffer comprise instructions to capture said document image using said second image-capture device.

23. A system as described in claim 22, wherein said second image-capture device comprises at least one of a pan adjustment control, a tilt adjustment control and a zoom adjustment control.

24. A system as described in claim 23, wherein said memory stores additional instructions to be executed by said computing system to:
- analyze said received image frame for content placement; and
- adjust, prior to said capturing, at least one of said pan adjustment control, said tilt adjustment control and said zoom adjustment control in response to said content placement.

25. A system as described in claim 15, wherein said memory stores additional instructions to be executed by said computing device to route said captured document image to a first recipient.

26. A system as described in claim 25, wherein said memory stores additional instructions to be executed by said computing device to determine, from a captured routing image, said first recipient.

27. A system for scanning a document, said system comprising:
- a first image-capture device;
- an active surface; and
- a computing system communicatively coupled to said first image-capture device, wherein said computing system comprises a memory storing instructions to be executed by said computing system to:
  - receive an image frame from said first image-capture device;
  - compare said received image frame with a previously captured image frame, wherein said instructions to compare said received image frame with said previously captured image frame comprise instructions to determine the optical flow between said received image frame and said previously captured image frame;
  - when said comparison indicates that said received image frame has stabilized relative to said previously captured image frame, determine if said received image frame is associated with a document; and
  - when said determining indicates that said received image frame is associated with a document, capture a document image associated with said image frame to a document buffer.

* * * * *